United States Patent
Lakkaraju et al.

(10) Patent No.: US 10,375,745 B1
(45) Date of Patent: Aug. 6, 2019

(54) MECHANISM FOR REALIZING LWA/LWIP AGGREGATOR FUNCTION

(71) Applicant: Cisco Technology, Inc., San Jose, CA (US)

(72) Inventors: Sangram Kishore Lakkaraju, Bangalore (IN); Vimal Srivastava, Bangalore (IN); Vivek Pise, Baner (IN); Srinath Gundavelli, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/904,182

(22) Filed: Feb. 23, 2018

(51) Int. Cl.
| | |
|---|---|
| *H04W 76/12* | (2018.01) |
| *H04L 12/46* | (2006.01) |
| *H04W 76/11* | (2018.01) |
| *H04W 88/06* | (2009.01) |
| *H04W 84/12* | (2009.01) |

(Continued)

(52) U.S. Cl.
CPC ......... *H04W 76/12* (2018.02); *H04L 12/4633* (2013.01); *H04W 76/11* (2018.02); *H04W 88/06* (2013.01); *H04W 48/16* (2013.01); *H04W 76/15* (2018.02); *H04W 84/12* (2013.01)

(58) Field of Classification Search
CPC ..... H04W 76/12; H04W 76/11; H04W 88/06; H04W 76/15; H04W 48/16; H04W 84/12; H04L 12/4633
See application file for complete search history.

(56) References Cited

U.S. PATENT DOCUMENTS 9,614,919 B1* 4/2017 Helbert ................. H04W 76/10
9,788,242 B2 10/2017 Nuggehalli et al.
(Continued)

FOREIGN PATENT DOCUMENTS

WO 2016/184373 A1 11/2016
WO 2017/131805 A1 8/2017

OTHER PUBLICATIONS

Technical Specification, "3rd Generation Partnership Project; Technical Specification Group Radio Access Network; Evolved Universal Terrestrial Radio Access Network (E-UTRAN) and Wireless Local Area Network (WLAN); Xw application protocol (XwAP) (Release 14)", 3GPP TS 36.463, V14.2.0, Jun. 2017, 113 pages.

(Continued)

*Primary Examiner* — Duc C Ho

(57) ABSTRACT

In one implementation, the method comprises, in response to obtaining a request to associate an electronic device with the one or more WLAN termination nodes: generating, between a base station and a networking device, a control link based on a first identifier associated with the base station; generating, between the networking device and a first WLAN termination node, a control link based on a second identifier that corresponds to a pseudonym for the base station; and associating the first and second identifiers in a control table. The method further comprises: instantiating, between the base station and the networking device, a first data tunnel associated with a first tunneling protocol; instantiating, between the networking device and the first WLAN termination node, a second data tunnel associated with a second tunneling protocol; and associating the first and second data tunnels.

20 Claims, 10 Drawing Sheets

(51) Int. Cl.
*H04W 76/15* (2018.01)
*H04W 48/16* (2009.01)

(56) References Cited

U.S. PATENT DOCUMENTS

| | | | |
|---|---|---|---|
| 9,854,588 B2 | 12/2017 | Veerepalli et al. | |
| 2013/0083661 A1* | 4/2013 | Gupta | H04W 4/70 370/235 |
| 2014/0064246 A1 | 3/2014 | Baillargeon | |
| 2015/0373607 A1* | 12/2015 | Zhu | H04W 36/22 370/331 |
| 2016/0302110 A1 | 10/2016 | Baboescu et al. | |
| 2016/0337485 A1 | 11/2016 | Nuggehalli et al. | |
| 2016/0338102 A1 | 11/2016 | Nuggehalli et al. | |
| 2017/0099625 A1 | 4/2017 | Li et al. | |

OTHER PUBLICATIONS

Technical Specification, "3rd Generation Partnership Project; Technical Specification Group Radio Access Network; Evolved Universal terrestrial Radio Access (E-UTRA) and Evolved Universal Terrestrial Radio Access Network (E-UTRAN); Overall description; Stage 2 (Release 14)", 3GPP TS 36.300, V14.5.0, Dec. 2017, pp. 1-100.

Technical Specification, "3rd Generation Partnership Project; Technical Specification Group Radio Access Network; Evolved Universal terrestrial Radio Access (E-UTRA) and Evolved Universal Terrestrial Radio Access Network (E-UTRAN); Overall description; Stage 2 (Release 14)", 3GPP TS 36.300, V14.5.0, Dec. 2017, pp. 101-200.

Technical Specification, "3rd Generation Partnership Project; Technical Specification Group Radio Access Network; Evolved Universal terrestrial Radio Access (E-UTRA) and Evolved Universal Terrestrial Radio Access Network (E-UTRAN); Overall description; Stage 2 (Release 14)", 3GPP TS 36.300, V14.5.0, Dec. 2017, pp. 201-331.

International Search Report and Written Opinion in counterpart International Application No. PCT/US2019/017962, dated Apr. 1, 2019, 13 pages.

"Further Discussion on UP Architecture of LTE/WLAN Aggregation", R2-153111, CATT, Agenda Item: 7.6.2.2, 3GPP TSG RAN WG2 Meeting #91, Beijing, China, Aug. 25-29, 2015, 5 pages.

* cited by examiner

US 10,375,745 B1

MECHANISM FOR REALIZING LWA/LWIP AGGREGATOR FUNCTION

TECHNICAL FIELD

The present disclosure relates generally to networking, and in particular, to link generating and tunnel instantiating in a heterogeneous network.

BACKGROUND

Certain networking deployments allow an electronic device to communicate with multiple networks associated with different radio access technologies (RATs). The multiple networks are sometimes collectively referred to as a heterogeneous network. A heterogeneous network provides a number of advantages, such as increased coverage, reliability, and spectrum efficiency. Certain heterogeneous networks facilitate concurrent communications between the electronic device and the networks associated with different RATs.

However, current deployments of these networks have numerous shortcomings. These deployments utilize inefficient link generation and traffic mapping schemes between nodes associated with different networks. For example, current deployments specify a separate link between each networking node associated with a first RAT and each networking node associated with a second RAT. These require large resource utilizations at the various networking nodes. As another example, networking nodes associated with a particular RAT receive data packets according to a non-native protocol. Consequently, these networking nodes must expend great computational resources for mapping purposes.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
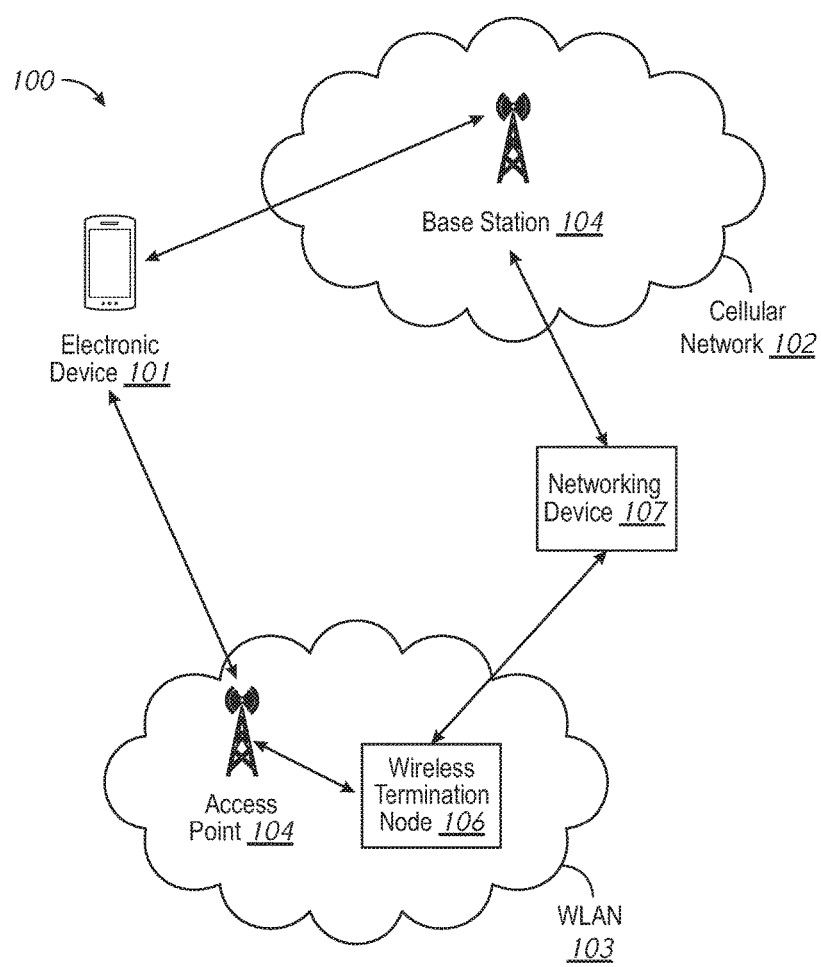
FIG. 1 illustrates a simplified diagram of a network environment according to various implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include methods, networking devices, and apparatuses for link generating and tunnel instantiating between networking nodes associated with different radio access technologies (RATs). The method comprises, at a networking device communicatively coupled to a base station and one or more wireless local area network (WLAN) termination nodes: obtaining a request to associate one or more electronic devices with the one or more WLAN termination nodes, wherein the one or more electronic devices are associated with the base station. The method further comprises in response to obtaining the request to associate the one or more electronic devices with the one or more WLAN termination nodes: generating, between the base station and the networking device, a control link based at least in part on a first identifier included in the request, wherein the first identifier is associated with the base station; generating, between the networking device and the first WLAN termination node among the one or more WLAN termination nodes, a control link based at least in part on a second identifier associated with the base station, wherein the second identifier corresponds to a pseudonym for the base station; and associating the first identifier with the second identifier in a control flow mapping table. The method further comprises instantiating, between the base station and the networking device, a first data tunnel associated with a first tunneling protocol. The method further comprises instantiating, between the networking device and the first WLAN termination node among the one or more WLAN termination nodes, a second data tunnel associated with a second tunneling protocol different from the first tunneling protocol. The method further comprises associating the first data tunnel with the second data tunnel in a data flow mapping table.

In accordance with various implementations, a networking device includes one or more processors, a non-transitory memory, and one or more programs. The one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a networking device, cause the networking device to perform or cause performance of any of the methods described herein. In accordance with some implementations, a networking device includes: one or more processors, a non-transitory memory, and means for performing or causing performance of any of the methods described herein.

Example Implementations

Certain current deployments facilitate communication between multiple networks associated with different radio access technologies (RATs) and one or more electronic devices. These networks are sometimes collectively referred to as a heterogeneous network. Certain current deployments allow one or more electronic devices to concurrently communicate with the networks.

However, current deployments inefficiently facilitate this communication. For example, in certain heterogeneous networks including a cellular network and a wireless local area network (WLAN), there must be a separate link between each base station and each wireless termination node. In order words, there are an M×N number of links, where M is the number of base stations and N is the number of wireless termination nodes. Generating this large number of links is complex and therefore computationally expensive. Moreover, storage resources are drained because, for example, each wireless termination node must store configuration data for numerous base stations in order to facilitate link generation.

Another problem with current deployments is that because these networks are associated with different RATs, data packets are received at a particular node according to a protocol that is not native to the particular node. For example, in certain deployments involving concurrent LTE and WLAN communications, the base station (e.g., eNodeB) receives data packets from a wireless termination node according to the WLAN-based generic routing encapsulation (GRE) tunnel protocol. Continuing with the example, the wireless termination node conversely receives data packets from the base station according to the cellular-based GPRS tunneling protocol user plane (GTP-U). This raises issues because each node is pre-configured to receive data packets according to its native respective protocol.

Accordingly, the present disclosure is directed to methods, devices, and apparatuses for link generating and tunnel instantiating in a heterogeneous network having networks associated with different RATs. In various implementations, this involves an electronic device in concurrent communications with a cellular network and a WLAN.

FIG. 1 illustrates a simplified diagram of a network environment 100 according to various implementations. The networking environment 100 includes an electronic device 101 in communication with a cellular network 102 and a WLAN 103. In various implementations, the electronic device 101 concurrently communicates with the cellular network 102 and the WLAN 103. It is to be appreciated that the term concurrent as used in the present disclosure includes substantially concurrent.

The electronic device 101 can be any device that includes multiple radios so as to allow it to communicate with multiple RATs, such as cellular and IEEE 802.11xx-based technologies (e.g., Wi-Fi). For example, the electronic device 101 corresponds to user equipment (UE) such as a mobile phone, laptop, tablet, set-top box, over-the-top box, video game console, or the like. In another example, the electronic device 101 corresponds to an Internet of Things (IoT) sensor, an autonomous driving vehicle system, a remote-controlled drone, a virtual/augmented reality system, or the like.

A base station 104 provides the electronic device 101 with connectivity to the cellular network 102 associated with a cellular RAT. Examples of cellular RATs include technologies defined by the 3rd Generation Partnership Project (3GPP), such as 3G, 4G, LTE, 5G, and the like. In various implementations, the base station 104 corresponds to a cellular base station. For example, in some implementations, the base stations 104 corresponds to an eNodeB (e.g., in 4G and LTE) and/or a gNodeB (e.g., in 5G). In various implementations, the base station 104 corresponds to a picocell. In various implementations, the base station 104 corresponds to a home eNodeB (HeNodeB), such as a Femtocell Gateway (F-GW)).

Although not depicted, in various implementations, the network environment 100 includes two or more base stations 104. In some implementations, the two or more base stations 104 provide overlapping coverage areas for the electronic device 101. In other words, the electronic device 101 is positioned so as to be connectable to two or more of the one or more base stations 104 at the same time. In some implementations, the electronic device 101 is considered within the coverage area of a respective base station among the one or more base stations 104 when there is an adequate signal strength between the electronic device 101 and the respective base station, as can indicated by, for example, a received signal strength indicator (RSSI).

An access point 105 provides the electronic device 101 with connectivity via an Ethernet link to the WLAN 103 associated with a wireless RAT. Examples of wireless RATs include IEEE 802.11xx-based networks, such as Wi-Fi and WiMax.

Although not depicted, in various implementations, the network environment 100 includes two or more access points 105 that provide overlapping coverage areas for the electronic device 101. In other words, the electronic device 101 is positioned so as to be connectable to multiple access points 105 at the same time. In some implementations, the electronic device 101 is considered within the coverage area of the access point 105 when there is an adequate signal strength between them, as can indicated by, for example, a received signal strength indicator (RSSI). For example, if the electronic device 101 is located in a shopping mall, there may be access points associated with stores close to each other that off Wi-Fi (e.g., two coffee shops near each other) but the electronic device 101 is connected to the access point to which it has a higher RSSI.

The WLAN 103 includes a wireless termination node 106. Although not depicted, in various implementations, the WLAN 103 includes two or more wireless termination nodes 106. In various implementations, the wireless termination node 106 provides connectivity between a networking device 107 and the access point 105. In various implementations, where the electronic device 101 is within the coverage area of multiple access points 105, there are multiple wireless termination nodes 106. In some implementations, there are an equal number of wireless termination nodes 106 as access points 105. In some implementations, there are fewer wireless termination nodes 106 than access points 105. For example, in some implementations, a wireless termination node 106 is integrated with (e.g., co-located or combined with) an access controller (AC) (not shown), and the AC manages multiple access points 105. In some implementations, the wireless termination node 106 and the AC are separate (e.g., not integrated).

The networking device 107 provides connectivity between the wireless termination node 106 and the base station 104. As further described in the present disclosure, the networking device 107 implements link generation and mapping between the cellular network 102 and the WLAN 103 according to various implementations. The networking device 107 includes a processor, a non-transitory memory, one or more input interfaces, and one or more output interfaces. In some implementations, the networking device 107 comprises its own node. In some implementations, the networking device 107 is integrated with (e.g., co-located or combined with) another node. For example, in some implementations, the networking device 107 is integrated with an X2 gateway node, which facilitates data plane and control plane signaling between two or more base stations 104 (e.g., macrocells, home eNodeBs (HeNBs), picocells, or the like). In some implementations, when the networking device 107 is integrated with (e.g., co-located or combined with) an existing node of a deployment, the deployment need not be changed (e.g., nodes need not be added to the existing deployment).

In various implementations, the electronic device 101 is concurrently connected to multiple networks associated with different RATs (e.g., the cellular network 102 and the WLAN 103). Concurrent connectivity can occur according to various technologies. One such technology is LTE-WLAN aggregation (LWA). LWA allows the electronic device 101 to concurrently utilize its LTE link and WLAN link. Under LWA, the infrastructure of the WLAN 103 communicates with the base station 104 (e.g., eNodeB), but not with the core cellular network. This eliminates the need for WLAN-specific core network nodes, as is specified by previous deployment types, such as LTE/WLAN interworking via untrusted WLAN access deployments (e.g., S2B). The wireless termination node 106 in LWA is a logical node referred to as a WLAN termination (WT). In some implementations, the networking device 107 is integrated with the WT. In some implementations, the base station 104 and the WT communicate with the networking device 107 via a standardized interface referred to as Xw, as is defined in 3GPP technical specifications (TSs) 36.463-36.465. In some implementations, the control links between the base station 104 and the networking device 107, and between the WT and the networking device 107, are referred to as Xw links.

Another technology that can be utilized for concurrent communications is LTE-WLAN Radio Level Integration with IPsec Tunnel (LWIP). Under LWIP, an IPsec tunnel provides connectivity between the electronic device 101 and the WLAN 103. The IPsec tunnel is transparent to infrastructure of the WLAN 103 and therefore, unlike LWA, there are no standardized interfaces. The wireless termination node 106 in LWIP is referred to as an IP-SecGW (IP security gateway). In some implementations, the networking device 107 is integrated with the IP-SecGW.

Figure 2:
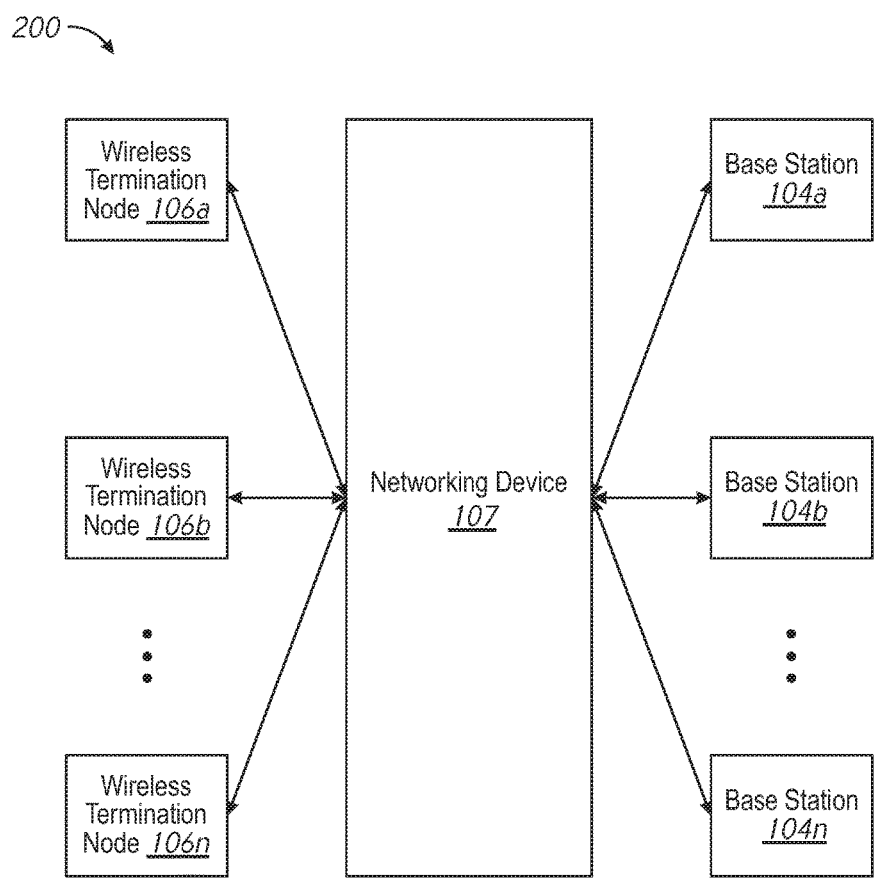
FIG. 2 illustrates a conceptual diagram of a networking environment according to various implementations.

FIG. 2 illustrates a conceptual diagram of a network environment 200 according to various implementations. The networking device 107 provides connectivity between wireless termination nodes 106a-106n and base stations 104a-104n.

The network environment 200 includes an M+N number of control links, where M is the number of base stations 104a-104n and N is the number of wireless termination nodes 106a-106n connected to the networking device 107. This is fewer than the M×N number of control links present in current systems, resulting in resource savings. These control links are effectively aggregated by the networking device 107.

Additionally, the networking device 107 provides improved data plane performance by mapping the cellular data packet protocol to the WLAN data packet protocol, and vice versa. This mapping improves network performance by providing the wireless termination nodes 106a-106n and the base stations 104a-104n with data packets according to their respective tunneling protocols. Additionally, the mapping leads to computational savings because the base stations 104a-104n need not be involved in control plane signalling. Moreover, the mapping reduces the amount of stored configuration information at the wireless termination nodes 106a-106n because they need not be aware of certain properties of the base stations 104a-104n.

Figure 3:
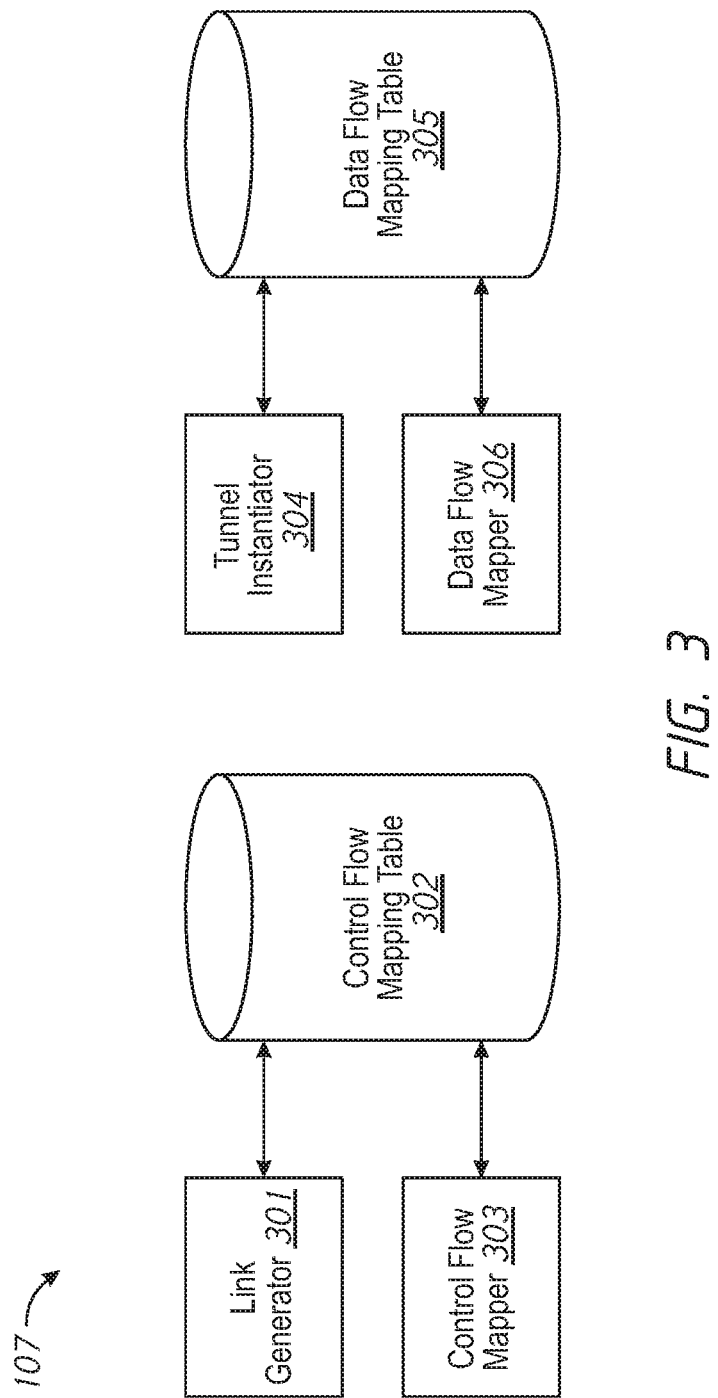
FIG. 3 illustrates a conceptual diagram of a networking device according to various implementations.

FIG. 3 illustrates a conceptual diagram of the networking device 107 according to various implementations. According to various implementations, the networking device 107 functions to generate control links between wireless termination nodes and base stations and to map the flow of data between them.

In some implementations, as shown in FIG. 3, the networking device 107 includes a link generator 301. The link generator 301 generates control between base stations and wireless termination nodes (e.g., the base stations 104a-104n and the wireless termination nodes 106a-106n in FIG. 2). In some implementations, the link generator 301 generates the control links according to known control plane protocols. For example, in some implementation, the link generator 301 generates an Xw link by using an Xw addition request message and an Xw addition request acknowledgement message. After a control link is generated between the networking device 107 and a particular base station, the networking device 107 appears to be a wireless termination node from the perspective of the particular base station. After a control link is generated between the networking device 107 and a particular wireless termination node, the networking device 107 appears to be a base station from the perspective of the particular wireless termination node.

Figure 4:
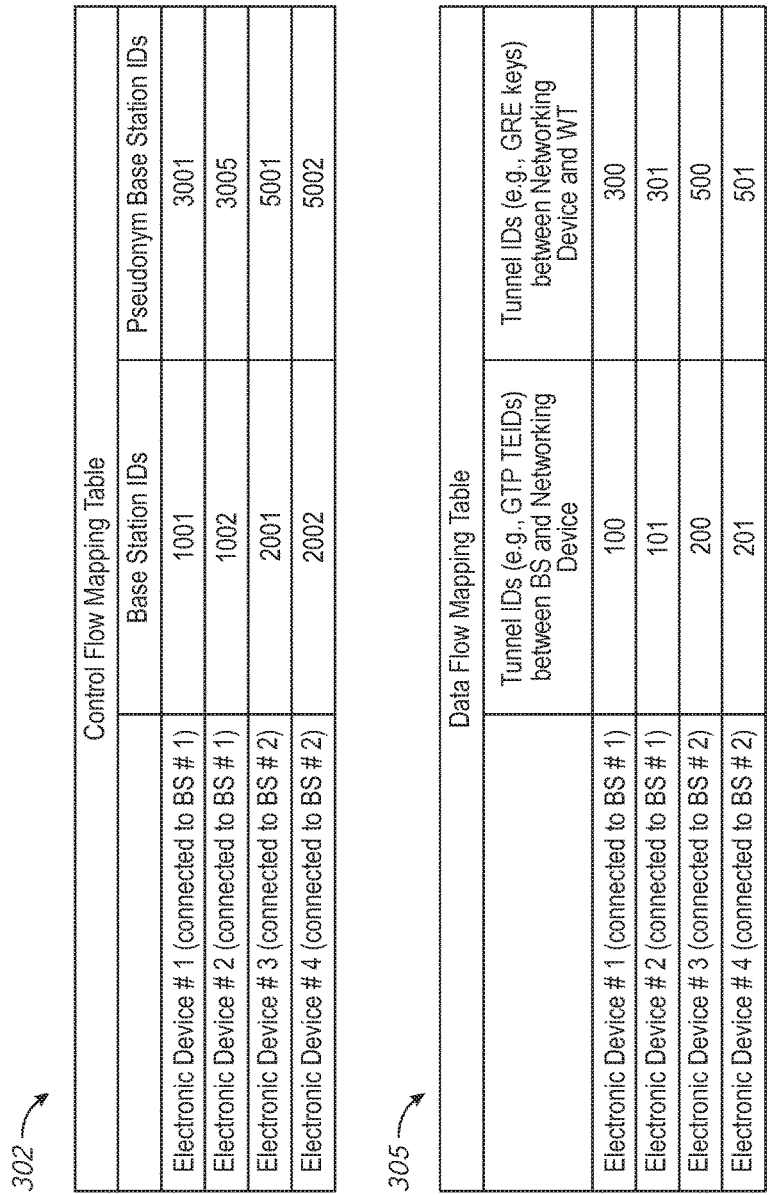
FIG. 4 illustrates exemplary data structure diagrams for a control flow mapping table and a data flow mapping table according to various implementations.

In various implementations, the link generator 301 populates a control flow mapping table 302 in conjunction with generating the control links. The control flow mapping table 302 can be part of any type of memory resource at the networking device 107. The control flow mapping table 302 includes a mapping between identification information identifying the base stations and identification information identifying the wireless termination nodes. An exemplary control flow mapping table 302 is illustrated in FIG. 4. In various implementations, the link generator 301 obtains identification information from a base station and stores the identification information in the control flow mapping table 302. In various implementations, the link generator 301 generates identification information identifying a wireless termination node and stores the identification information in the control flow mapping table 302. In some implementations, the link generator 301 generates identification information identifying a wireless termination node based on identification information identifying one or more base stations.

In some implementations, as shown in FIG. 3, the networking device 107 includes a control flow mapper 303. The control flow mapper 303 utilizes the control flow mapping table 302 in order to map control packets between base stations and wireless termination nodes. The control flow mapper 303 modifies a control packet received from a particular base station so that the control packet reaches the appropriate destination wireless termination node, and vice verse. In various implementations, the control flow mapper 303 modifies the value of identification information included in an incoming control packet. The identification information is changed to a value associated with the appropriately mapped destination node.

In some implementations, as shown in FIG. 3, the networking device 107 includes a tunnel instantiator 304. The tunnel instantiator 304 instantiates data tunnels associated with a first protocol between the networking device 107 and corresponding base stations. The tunnel instantiator 304 also instantiates data tunnels associated with a second protocol between the networking device 107 and corresponding wireless termination nodes. The instantiated data tunnels carry data packets between base stations and wireless termination nodes via the networking device 107.

In various implementations, the tunnel instantiator 304 populates a data flow mapping table 305 in conjunction with instantiating data tunnels. The data flow mapping table 305 can be part of any type of memory resource at the networking device 107. An exemplary data flow mapping table 305 is illustrated in FIG. 4. The data flow mapping table 305 includes identifiers identifying the instantiated data tunnels. The data flow mapping table 305 includes mappings between identifiers identifying data tunnels associated with base stations and identifiers identifying data tunnels associated with wireless termination nodes.

In some implementations, as shown in FIG. 3, the networking device 107 includes a data flow mapper 306. The data flow mapper 306 utilizes the data flow mapping table 305 in order to map data packets between base stations and wireless termination nodes. The data flow mapper 306 maps a data packet received from a base station according to a first protocol to a data packet destined for a wireless termination node according to a second protocol. The data flow mapper 306 also maps a data packet received from a wireless termination node according to the second protocol to a data packet destined for a base station according to the first protocol. This effectively provides the receiving networking node with data packets in their native format, leading to improved transmission performance. As an example, an incoming data packet received at the networking device 107 includes an identifier indicating the data tunnel through which it was received. Continuing with this example, the data flow mapper 306, based on entries of data flow mapping table 305, modifies the identifier of the received data packet to correspond to the data tunnel through which it is to be forwarded.

In various implementations the first protocol corresponds to a general packet radio service (GPRS) tunneling protocol user plane (GTP-U). In various implementations, the second protocol corresponds to a generic routing encapsulation (GRE) protocol.

According to some implementations, data packets transported between the base station(s) and the wireless termination node(s) correspond to Internet Protocol (IP) data packets (e.g., IPv4 and/or IPv6). According to some implementations, the data packets correspond to point-to-point (PPP) data packets. According to some implementations, the data packets correspond to a combination of IP data packets and PPP data packets. According to some implementations, data packets sent from and/or received at the wireless termination node are encapsulated, such as an IP data packet (e.g., IP payload) encapsulated by the GRE protocol.

FIG. 4 illustrates exemplary data structure diagrams for a control flow mapping table 302 and a data flow mapping table 305 according to various implementations. In various implementations, the control flow mapping table 302 is populated by a link generator (e.g., the link generator 301 in FIG. 3) and utilized by a control flow mapper (e.g., the control flow mapper 303 in FIG. 3). In various implementations, the data flow mapping table 305 is populated by a tunnel instantiator (e.g., the tunnel instantiator 304 in FIG. 3) and utilized by a data flow mapper (e.g., the data flow mapper 306 in FIG. 3).

The tables 302 and 305 of FIG. 4 assume a networking environment with four electronic devices (electronic device #1-electronic device #4), two base stations (BS #1 and BS #2), and four wireless termination nodes, each of which providing coverage to one of the four electronic devices. In other words, each electronic device is being serviced by one wireless termination node. However, one or ordinary skill in the art will appreciate that the control flow mapping table 302 and the data flow mapping table 305 can account for various situations in which one or more electronic devices are each being concurrently serviced by numerous wireless termination nodes. Moreover, one of ordinary skill in the art will appreciate that the control flow mapping table 302 and the data flow mapping table 305 can account for more or fewer of either or both of the base stations and/or wireless termination nodes. Moreover, in various implementations, one of ordinary skill in the art will appreciate that the control flow mapping table 302 may be structured and/or formatted differently.

The control flow mapping table 302 includes base station identifiers in order to identify a particular base station with a particular electronic device. The control flow mapping table 302 includes identifier values of 1001 and 1002 for identifying BS #1 with electronic device #1 and electronic device #2, respectively. The control flow mapping table 302 includes identifier values of 2001 and 2002 for identifying BS #2 with electronic device #3 and electronic device #4, respectively.

The control flow mapping table 302 provides a mapping between the two base stations identifiers and identifiers associated with the four wireless termination nodes. The control flow mapping table 302 provides pseudonym identifiers for the four wireless termination nodes based on the base station identifiers. With respect to electronic device #1, the control flow mapping table 302 maps the identifier value of 1001 to a pseudonym identifier value of 3001 associated with the first wireless termination node. With respect to electronic device #2, the control flow mapping table 302 maps the identifier value of 1002 to a pseudonym identifier value of 3005 associated with the second wireless termination node. With respect to electronic device #3, the control flow mapping table 302 maps the identifier value of 2001 to a pseudonym identifier value of 5001 associated with the third wireless termination node. With respect to electronic device #4, the control flow mapping table 302 maps the identifier value of 2001 to a pseudonym identifier value of 5002 associated with the fourth wireless termination node.

Although the control flow mapping table 302 contemplates a one-to-one mapping between a particular electronic device and particular wireless termination node, one of ordinary skill in the art will appreciate that various mapping schemes can be implemented. For example, in various implementations, an electronic device, as a result of a mobility event, moves within the coverage area of multiple WLANs. For example, electronic device #1 experiences a mobility event (e.g., mobile phone user walks near a coffee shop's Wi-Fi), causing the electronic device #1 to move within the coverage area of the second wireless termination node while remaining in the coverage area of the first wireless termination node. Consequently, the control flow mapping table 302 changes the pseudonym value from 3001 to [3001, 3005], wherein 3001 maps to the first wireless termination node and 3005 maps to the second wireless termination node.

As an exemplary operation of the control flow mapping table 302, BS #1, after associating with electronic device #1, sends a request including an identifier value of 1001 to the networking device in order to generate a control link with the networking device. Continuing with this example, the networking device generates a pseudonym value of 3001 for the first wireless termination node. Continuing with this example, the networking device populates the control flow mapping table 302 with the 1001 and 3001 identifier values in order to associate BS #1 with the first wireless termination node. In various implementations, one of ordinary skill in the art will appreciate that that the identifiers identifying the base stations and the wireless termination can have a variety of values and/or formats.

The data flow mapping table 305 includes data tunnel identifiers in order to map data tunnels identifiers between the two base stations and the networking device, and in order to map data tunnel identifiers between the networking device and the four wireless termination nodes. With respect to the first electronic device, the data flow mapping table 305 includes a data tunnel identifier value of 100 for identifying a data tunnel between the networking device and BS #1. With respect to the second electronic device, the data flow mapping table 305 includes a data tunnel identifier value of 101 for identifying a data tunnel between the networking device and BS #1. With respect to the third electronic device, the data flow mapping table 305 includes a data tunnel identifier value of 200 for identifying a data tunnel between the networking device and BS #2. With respect to the fourth electronic device, the data flow mapping table 305 includes a data tunnel identifier value of 201 for identifying a data tunnel between the networking device and BS #2.

The data flow mapping table 305 provides a mapping between the two base stations data tunnel identifiers and data tunnel identifiers associated with the four wireless termination nodes. The data flow mapping table 305 provides data tunnel identifiers for the four wireless termination nodes based on the base station data tunnel identifiers. With respect to electronic device #1, the data flow mapping table 305 maps the data tunnel identifier value of 100 to a value of 300 associated with the data tunnel of the first wireless termination node. With respect to electronic device #2, the data flow mapping table 305 maps the data tunnel identifier value of 101 to a value of 301 associated with the data tunnel of the second wireless termination node. With respect to electronic device #3, the data flow mapping table 305 maps the data tunnel identifier value of 200 to a value of 500 associated with the data tunnel of the third wireless termination node. With respect to electronic device #4, the data flow mapping table 305 maps the data tunnel identifier value of 201 to a value of 501 associated with the data tunnel of the fourth wireless termination node.

Although the data flow mapping table 305 contemplates a one-to-one mapping between a particular electronic device and particular wireless termination node, one of ordinary skill in the art will appreciate that various mapping schemes can be implemented. For example, in various implementations, an electronic device, as a result of a mobility event, moves within the coverage area of multiple WLANs. For example, electronic device #2 experiences a mobility event (e.g., tablet user enter his building of employment), causing the electronic device #2 to move within the coverage area of the third wireless termination node while remaining in the coverage area of the second wireless termination node. Consequently, the data flow mapping table 305 changes the data tunnel identifier value from 301 to [301, 600], wherein 301 maps to the second wireless termination node data tunnel and 600 (not shown) maps to the third wireless termination node data tunnel.

In some implementations, as shown in FIG. 4, the data flow mapping table 305 includes a mapping between identification information associated with base station data tunnels and identification information associated with wireless termination node data tunnels. Data tunnels between the base stations and the networking device are associated with a first protocol, and data tunnels between the wireless termination nodes and the networking device are associated with a second protocol. As shown in FIG. 4, the data flow mapping table 305 includes a column for each of the base stations. In various implementations, one of ordinary skill in the art will appreciate that the data flow mapping table 305 may be structured and/or formatted differently.

In various implementations, a data packet received according to GTP-U includes a tunnel endpoint ID (TEID). In various implementations, a data packet received according to GRE includes a GRE key. In some implementations, the data flow mapper, based on information in the data flow mapping table 305, replaces the TEID of a data packet received from a base station with a GRE key associated with the destination wireless termination node. In some implementations, the data flow mapper, based on information in the data flow mapping table 305, replaces the GRE key of a data packet received from a wireless termination node with a TEID associated with the destination base station.

As an exemplary operation of the data flow mapping table 305, the networking device receives a data packet from the second wireless termination node that is destined for electronic device #2. Continuing with this example, the networking device changes the data packet identifier value from 301 (e.g., a GRE key value) to 101 (e.g., a GTP-U TEID value). This way, the data packet is forwarded through the BS #2 data tunnel in order to reach electronic device #2. As another exemplary operation of the data flow mapping table 305, the networking device receives a data packet originating at electronic device #4 that is destined for the fourth wireless termination node. Continuing with this example, the networking device changes the data packet identifier values from 201 (e.g., a GTP-U TEID value) to 501 (e.g., a GRE key value). This way, the data packet is forwarded through the fourth wireless termination node data tunnel in order to reach the fourth wireless termination node.

Figure 5:
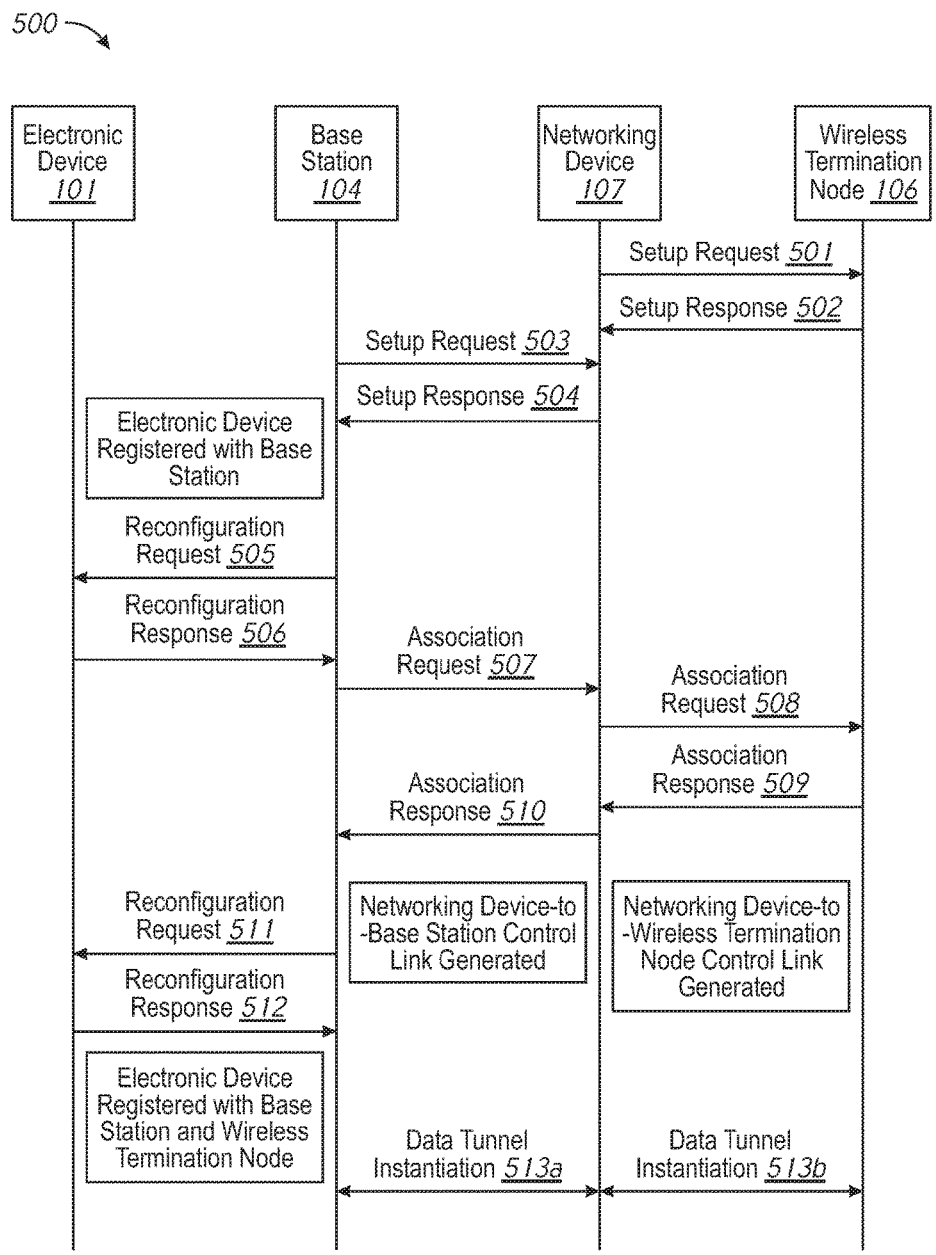
FIG. 5 illustrates a conceptual diagram of a setup flow associated with a networking device according to various implementations.

FIG. 5 illustrates a conceptual diagram of a setup flow 500 associated with a networking device according to various implementations. FIG. 5 includes a setup flow involving an electronic device 101, a base station 104, a networking device 107, and a wireless termination node 106. It is to be appreciated that the setup flow is equally applicable to a networking environment having more of any or all of these components.

According to some implementations, the networking device 107 sends a setup request 501 to the wireless termination node 106. The setup request 501 includes base station identification information. Accordingly, from the perspective of the wireless termination node 106, the networking device 107 appears to be a base station. In some implementations, the setup request 501 corresponds to an Xw setup request message. In response, the wireless termination node 106 sends a setup response 502 to the networking device 107. In some implementations, the setup response 502 corresponds to an Xw setup response message.

According to some implementations, the base station 104 sends a setup request 503 to the networking device 107. The setup request 503 includes identification information of the base station 104. In some implementations, the setup request 503 corresponds to an Xw setup request message. In response, the networking device 107 sends a setup response 504 to the base station 104. Accordingly, from the perspective of the base station 104, the networking device 107 appears to be a wireless termination node. In some implementations, the setup response 504 corresponds to an Xw setup response message. In various implementations, additional base stations (not shown) initiate setup procedures with the networking device 107.

In some implementations, in response to the setup procedure between the base station 104 and the networking device 107, the base station 104 sends a reconfiguration request 505 to an electronic device 101 with which it is registered. In some implementations, the reconfiguration request 505 corresponds to an RRC_Connection_Reconfiguration message. In response, the electronic device 101 sends a reconfiguration response 506 to the base station 104. In some implementations, the reconfiguration response 506 corresponds to an RRC_Connection_Reconfiguration_Complete message. In various implementations, after the electronic device 101 sends the reconfiguration response 506, the electronic device 101 sends a measurement report message (e.g., WLAN information) (not shown) to the base station 104.

According to some implementations, the base station 104 sends an association request 507 to the networking device 107. The association request 507 functions in part to request a wireless termination node to prepare resources for concurrent communications. For example, in some LWA implementations, the base station 104 (e.g., eNodeB) send the association request 507 to the wireless termination node 106 (e.g., WT) to prepare resources for LWA aggregation for the electronic device 101. In various implementations, the association request 507 includes an identifier associated with the electronic device 101 and/or an identifier identifying the data tunnel with which the base station 104 is associated. In some implementations, the association request 507 corresponds to an Xw addition request message. For example, in some implementations, the association request 507 includes values indicative of an eNBUeXwID, UEID, and/or eRABIDs (e.g., eNodeB TEIDs and PLMN ID). For example, the eNBUeXwID corresponds to an identifier associating the electronic device 101 with the base station 104. For example, the UEID corresponds to an identifier identifying the electronic device 101. For example, the eRABIDs corresponds to identifiers identifying radio access bearers (RABs), such as an evolved universal mobile telecommunications system (UMTS) terrestrial radio access network (E-UTRAN) RAB.

In some implementations, in response to receiving the association request 507, the networking device 107 sends a corresponding association request 508 to the wireless termination node 106. The association request 508 includes a mapped version of the identification information corresponding to the association request 507. In some implementations, the association request 508 corresponds to an Xw wireless termination node addition request message, such as an Xw WT addition request message.

In some implementations, in response to receiving the association request 508, the wireless termination node 106 sends the networking device 107 an association response 509. In some implementations, the association response 509 corresponds to an Xw addition request acknowledge message. For example, in some implementations, the association response 509 includes values indicative of a mapped eNBUeXwID, UEID, eRABIDs (e.g., XGW TEID), and/or WTUeXWid. For example, the WTUeXWid corresponds to an identifier associating the electronic device 101 with the wireless termination node 106.

In some implementations, in response to receiving the association response 509, the networking device 107 sends a corresponding association response 510 to the base station 104. The association response 510 includes identification information corresponding to the identification information associated with the association request 507. In some implementations, the association response 510 corresponds to an Xw addition request acknowledge message. For example, in some implementations, the association response 510 includes values indicative of eNBUeXwID, UEID, eRABIDs (e.g., XGW TEID), and/or WTUeXWid. At this point, a control link between the networking device 107 and wireless termination node 106 and a control link between the networking device 107 and the base station 104 have been established.

According to some implementations, the base station 104 sends a reconfiguration request 511 to the electronic device 101, which responds with a reconfiguration response 512. At this point, the electronic device 101 is registered with the base station 104 and the wireless termination node 106.

According to some implementations, at 513a, the networking device 107 instantiates a data tunnel with the base station 104. In various implementations, the networking device 107 instantiates a GTP tunnel with the base station 104 based on values corresponding to the eNodeB TEID and/or the XGW TEID.

According to some implementations, at 513b, the networking device 107 instantiates a data tunnel with the wireless termination node 106. In various implementations, the networking device 107 instantiates a GRE tunnel with the wireless termination node 106 based on values corresponding to the XGW GRE key and/or the WT GRE key.

Figure 6:
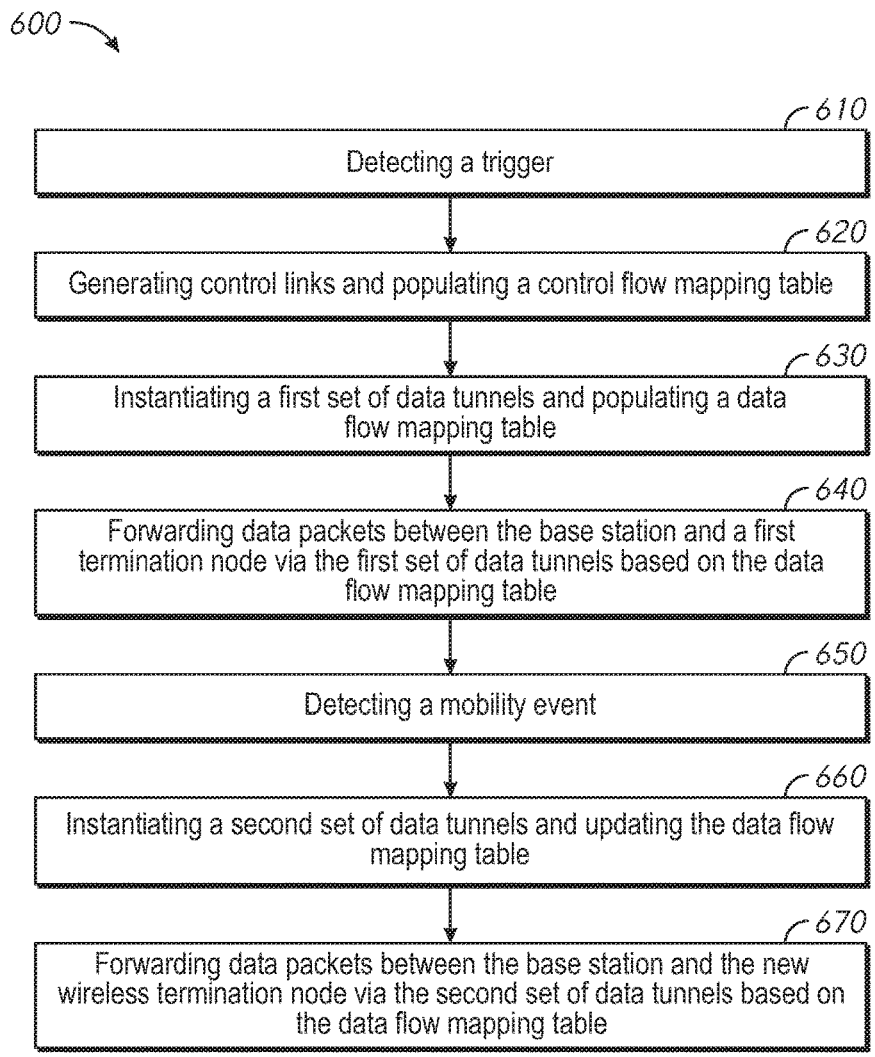
FIG. 6 illustrates a flowchart representation of a method of link generating and tunnel instantiating according to various implementations.

FIG. 6 illustrates a flowchart representation of a method 600 of link generating and tunnel instantiating according to various implementations. According to various implementations, the method 600 is performed by a networking device (e.g., networking device 107). According to various implementations, the method 600 is performed by a networking device (e.g., the networking device 107 in FIGS. 1-3) with one or more processors and a non-transitory memory, wherein the networking device is communicatively coupled to a base station and one or more wireless local area network (WLAN) termination nodes.

As represented by block 610, the method 600 includes detecting a trigger. According to various implementations, the networking device 107 detects a trigger when a device establishes or attempts to establish connectivity with the networking device 107. As one example, the networking device 107 detects the trigger when the electronic device 101 establishes connectivity with the access point 105 and/or the base station 104. As another example, the networking device 107 detects a trigger when the wireless termination node 106 establishes connectivity with the networking device 107. As yet another example, the networking device 107 detects a trigger when the base station 104 establishes connectivity with the networking device 107. According to various implementations, the networking device 107 detects a trigger when the networking device 107 receives a request to associate the base station 104 with the wireless termination node 106. According to various implementations, the networking device 107 detects a trigger when the networking device 107 receives a registration request associated with the electronic device 101 from the base station 104.

As represented by block 620, the method 600 includes generating control links and populating a control flow mapping table. According to various implementations, the networking device 107 or a component thereof (e.g., the link generator 301 in FIG. 3) generates a control link between the networking device 107 and the base station 104 based on a first identifier associated with the base station 104. According to various implementations, the networking device 107 or a component thereof (e.g., the link generator 301 in FIG. 3) generates control links between the networking device 107 and a plurality of wireless termination nodes (e.g., including the first wireless termination node described with reference to blocks 630-640 and the new wireless termination node described with reference to blocks 660-670) based on a second identifier associated with the base station 104. As such, there is an M×N number of control links (e.g., Xw links), where M is the number of base stations and N is the number of wireless termination nodes. This is fewer than the M×N number of control links present in current systems, resulting in resource savings.

In various implementations, the second identifier corresponds to a pseudonym for the base station 104. By using a pseudonym for the base station 104, the networking device 107 appears to be a base station from the perspective of the wireless termination node 106, and appears to be a wireless termination node from the perspective of the base station 104. Accordingly, mobility events of the electronic device 101 occur seamlessly and are hidden from the base station 104. For example, a mobility event can cause a hand-off of service between wireless termination nodes. This service hand-off is transparent from the perspective of the base station 104 due to the abstraction or decoupling performed by the networking device 107.

According to various implementations, the networking device 107 or a component thereof (e.g., the control flow mapper 303 in FIG. 3) associates or otherwise links the first and second identifiers by creating a new entry within the control flow mapping table (e.g., the control flow mapping table 302 in FIGS. 3 and 4). For example, with reference to the first column of the control mapping table 302 of FIG. 4, the networking device 107 populates the control flow mapping table 302 with an identifier having a value of 1001 for BS #1 and generates a link with BS #1 according to the identifier. Continuing with the example, the networking device 107, based on the identifier, generates a pseudonym identifier having a value of 3001 for the first wireless termination node. Continuing with the example, the networking device 107 generates a link with the first wireless termination node according to the pseudonym identifier.

As represented by block 630, the method 600 includes instantiating a first set of data tunnels and populating a data flow mapping table. According to various implementations, the networking device 107 or a component thereof (e.g., the tunnel instantiator 304 in FIG. 3) instantiates the first set of data tunnels. In some implementations, the first set of data tunnels includes: (A) a first data tunnel between the base station and the networking device 107 according to a first tunneling protocol (e.g., GTP); and (B) a second data tunnel between the networking device 107 and a first wireless termination node according to a second tunneling protocol (e.g., GRE). According to various implementations, the first set of data tunnels are instantiated in response to the trigger detected in block 610, such as when the electronic device 101 moves within the coverage area of the first wireless termination node.

According to various implementations, the networking device 107 or a component thereof (e.g., the data flow mapper 306 in FIG. 3) associates or otherwise links the first and second data tunnels by creating a new entry within the data flow mapping table (e.g., the data flow mapping table 305 in FIGS. 3 and 4). The association informs data packet forwarding decisions, and allows the base station and the first wireless termination node to receive data packets according to their native/preferred tunneling protocol. For example, in some implementations, the base station 104 can receive and transmit data packets across the first data tunnel according to the GTP-U protocol. As another example, in some implementations, the wireless termination node 106 can receive and transmit data packets across the second data tunnel according to the GRE protocol.

In some implementations, the data flow mapping table 305 includes a mapping between an identifier associated with the first data tunnel and an identifier associated with the second data tunnel. For example, with reference to the data mapping table 305 of FIG. 4, the row entry values of 200 and 500 indicate a mapping between a data tunnel identifier associated with BS #2 and a data tunnel identifier associated with the third wireless termination node.

As represented by block 640, the method 600 includes forwarding data packets between the base station 104 and the first wireless termination node via the first set of data tunnels based on the data flow mapping table. For example, with reference to the data flow mapping table 305 in FIG. 4, the networking device 107 receives a data packet from the second wireless termination node according to GRE. Continuing with this example, the networking device 107 changes the identifier of the data packet from a value of 301 to 101 (e.g., a GTP-U TEID value). Continuing with this example, the networking device 107 forwards the modified data packet towards BS #1 through the data tunnel identified by the value of 101.

As represented by block 650, the method 600 includes detecting a mobility event associated with the electronic device 101. In various implementations, the mobility event occurs when the electronic device 101 moves (or roams) from the coverage area serviced by the first wireless termination node to a new coverage area services by a new wireless termination node. For example, with reference to FIG. 2, the mobility event occurs when the electronic device 101 moves from the coverage area of wireless termination node 106a to the coverage area of wireless termination node 106b. Continuing with this example, in some implementations, the electronic device 101 remains within the coverage area of wireless termination node 106a after moving to the coverage area of wireless termination node 106b.

As represented by block 660, the method 600 includes instantiating a second set of data tunnels and updating the data flow mapping table. According to various implementations, the networking device 107 or a component thereof (e.g., the tunnel instantiator 304 in FIG. 3) instantiates the second set of data tunnels. In some implementations, the second set of data tunnels includes: (A) the first data tunnel between the base station and the networking device 107 according to the first tunneling protocol (e.g., GTP); and (B) a third data tunnel between the networking device 107 and the new wireless termination node according to the second tunneling protocol (e.g., GRE). According to various implementations, the second set of data tunnels are instantiated in response to the mobility event detected in block 650 (e.g., the electronic device 101 moves from the coverage area serviced by the first wireless termination node to the coverage area serviced by the new wireless termination node). According to various implementations, the networking device 107 or a component thereof (e.g., the data flow mapper 306 in FIG. 3) updates the data flow mapping table (e.g., the data flow mapping table 305 in FIGS. 3 and 4) to include an association or link between the first and third data tunnels.

As represented by block 670, the method 600 includes forwarding data packets between the base station and the new wireless termination node via the second set of data tunnels based on the data flow mapping table. For example, with reference to the data flow mapping table 305 in FIG. 4, the mapping table 305 includes a 100:300 mapping between BS #1 and the first wireless termination node before the networking device detects a mobility event of electronic device #1. Continuing with this example, the networking device detects the mobility event (e.g., at block 650), wherein electronic device #1 moves from the coverage area of the first wireless termination node to the coverage areas of both the first and second wireless termination nodes. Continuing with this example, in response to detecting the mobility event, the networking device updates the data flow mapping table from 100:300 to 100: [300, 301], wherein 300 and 301 corresponds to the first and second wireless termination nodes, respectively. Continuing with this example, based on the updated mapping, the networking device forwards a received data packet having an identifier value of 300 and/or 301 towards electronic device #1, and forwards a received data packet having an identifier value of 100 to the first wireless termination node and/or the second wireless termination node.

Figure 7A:
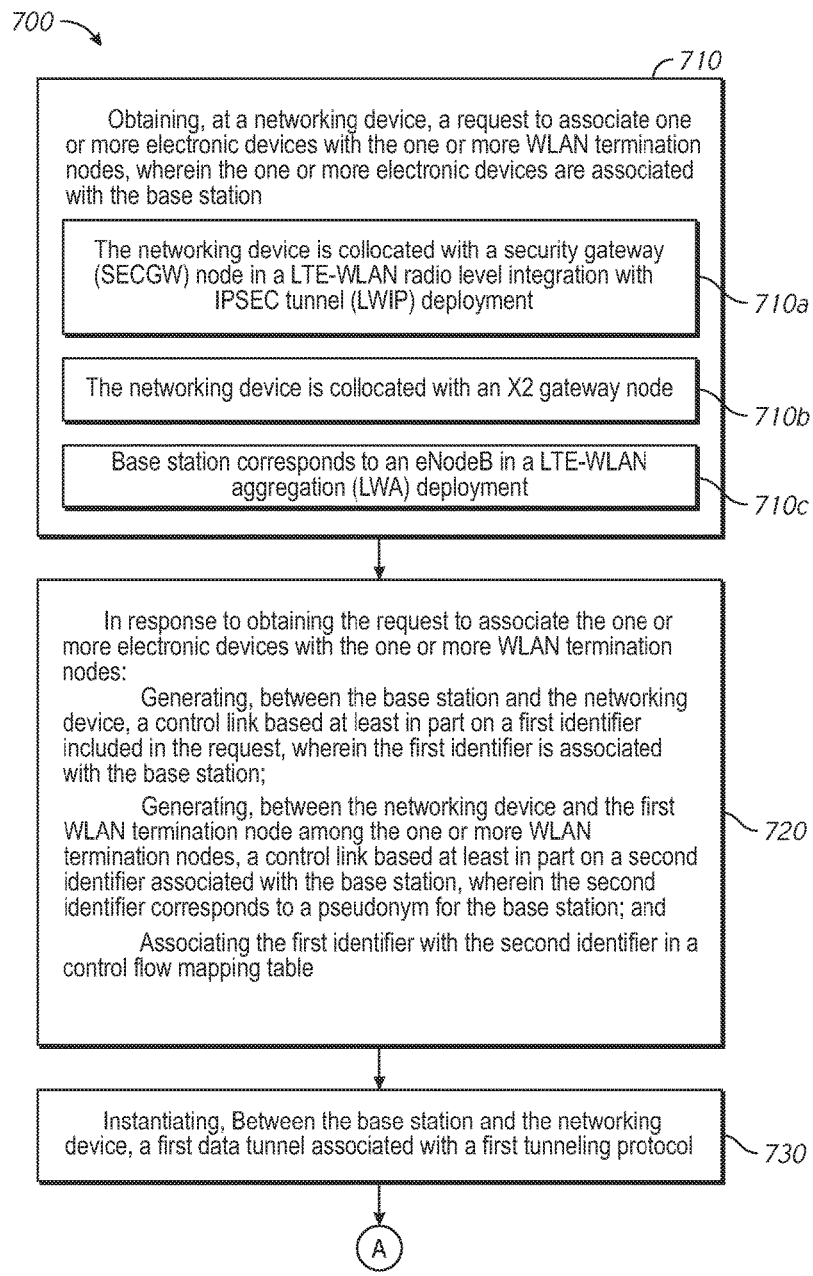
FIGS. 7A-7C illustrate a flowchart representation of a method of link generating and tunnel instantiating according to various implementations.
Figure 7B:
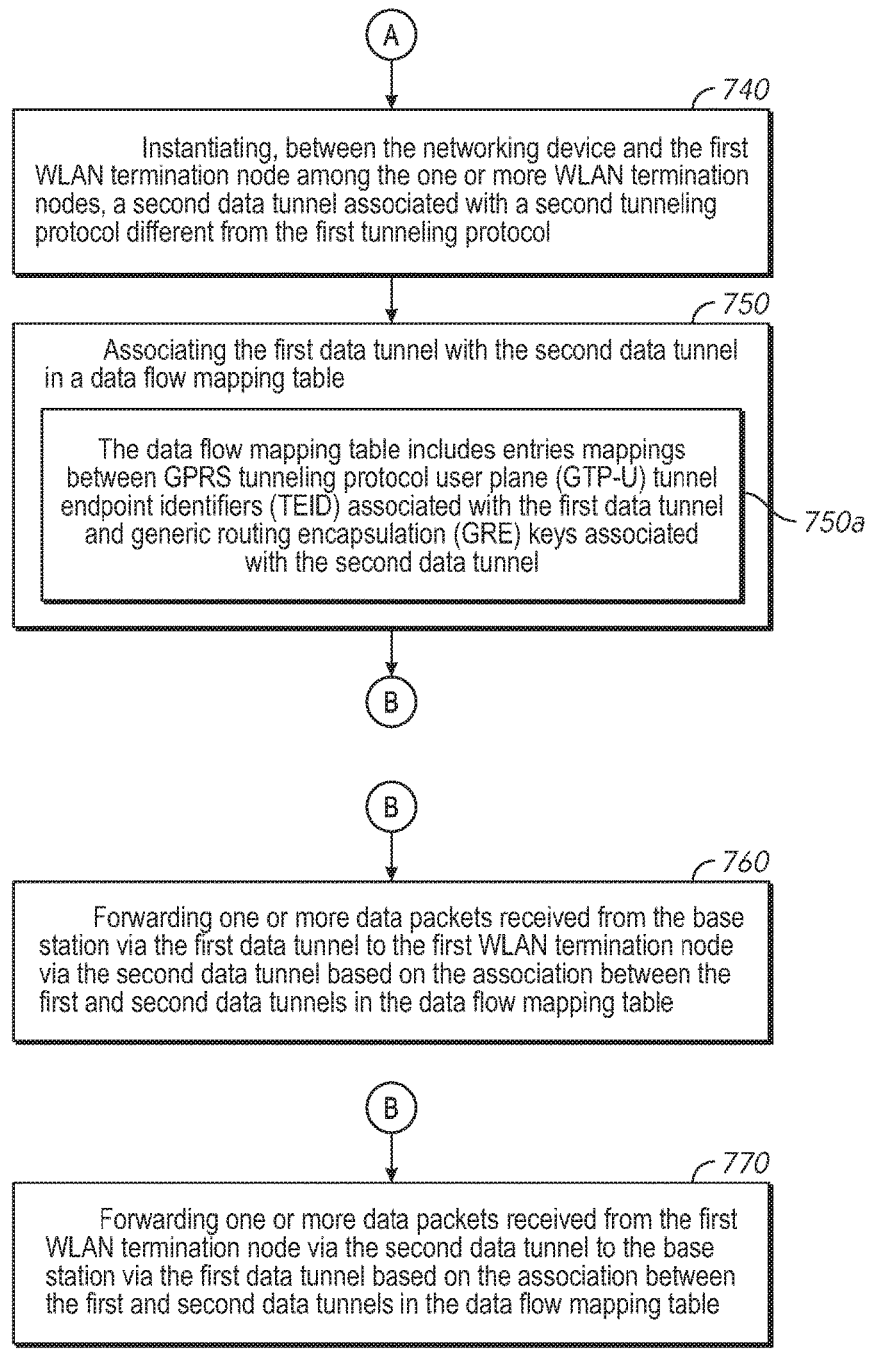
Figure 7C:
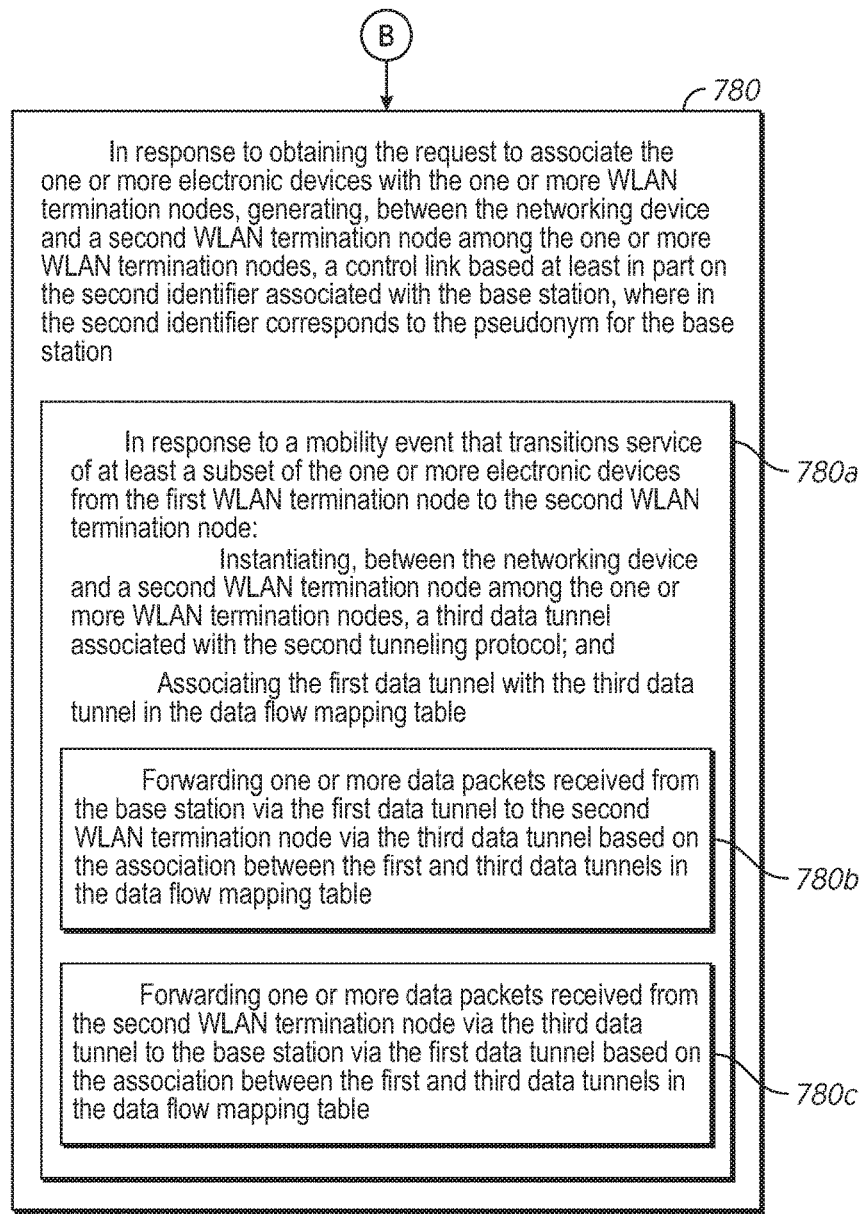

FIGS. 7A-7C illustrate a flowchart representation of a method 700 of link generating and tunnel instantiating according to various implementations. According to various implementations, the method 700 is performed by a networking device (e.g., networking device 107). According to various implementations, the method 700 is performed by a networking device (e.g., the networking device 107 in FIGS. 1-3) with one or more processors and a non-transitory memory, wherein the networking device is communicatively coupled to a base station and one or more wireless local area network (WLAN) termination nodes.

With reference to FIG. 7A, as represented by block 710, the method 700 includes obtaining, at the networking device, a request to associate one or more electronic devices with the one or more WLAN termination nodes, wherein the one or more electronic devices are associated with the base station. In various implementations, as represented by block 710a, the networking device is collocated with a security gateway (SecGW) node in a LTE-WLAN radio level integration with IPsec tunnel (LWIP) deployment. In various implementations, as represented by block 710b, the networking device is collocated with an X2 gateway node. In various implementations, as represented by block 710c, the base station corresponds to an eNodeB in a LTE-WLAN aggregation (LWA) deployment.

As represented by block 720, the method 700 includes in response to obtaining the request to associate the one or more electronic devices with the one or more WLAN termination nodes: generating, between the base station and the networking device, a control link based at least in part on a first identifier included in the request, wherein the first identifier is associated with the base station; generating, between the networking device and the first WLAN termination node among the one or more WLAN termination nodes, a control link based at least in part on a second identifier associated with the base station, wherein the second identifier corresponds to a pseudonym for the base station; and associating the first identifier with the second identifier in a control flow mapping table. As represented by block 730, the method 700 includes instantiating, between the base station and the networking device, a first data tunnel associated with a first tunneling protocol.

With reference to FIG. 7B, the flowchart continues to block 740, wherein the method 700 includes instantiating, between the networking device and the first WLAN termination node among the one or more WLAN termination nodes, a second data tunnel associated with a second tunneling protocol different from the first tunneling protocol.

As represented by block 750, the method includes associating the first data tunnel with the second data tunnel in a data flow mapping table. In various implementations, as represented by block 750a, the data flow mapping table includes entries mappings between GPRS tunneling protocol user plane (GTP-U) tunnel endpoint identifiers (TEID) associated with the first data tunnel and generic routing encapsulation (GRE) keys associated with the second data tunnel.

As represented by block 760, in various implementations, the method 700 includes forwarding one or more data packets received from the base station via the first data tunnel to the first WLAN termination node via the second data tunnel based on the association between the first and second data tunnels in the data flow mapping table. As represented by block 770, in various implementations, the method 700 includes forwarding one or more data packets received from the first WLAN termination node via the second data tunnel to the base station via the first data tunnel based on the association between the first and second data tunnels in the data flow mapping table.

With reference to FIG. 7C, the flowchart continues to block 780, wherein the method 700 includes, in various implementations, in response to obtaining the request to associate the one or more electronic devices with the one or more WLAN termination nodes, generating, between the networking device and a second WLAN termination node among the one or more WLAN termination nodes, a control link based at least in part on the second identifier associated with the base station, wherein the second identifier corresponds to the pseudonym for the base station. As represented by block 780a, in various implementations, the method 700 includes in response to a mobility event that transitions service of at least a subset of the one or more electronic devices from the first WLAN termination node to the second WLAN termination node: instantiating, between the networking device and a second WLAN termination node among the one or more WLAN termination nodes, a third data tunnel associated with the second tunneling protocol; and associating the first data tunnel with the third data tunnel in the data flow mapping table. The mobility event is transparent to the base station as the second WLAN termination interacts with the at least a subset of the one or more electronic devices.

As represented by block 780b, in various implementations, the method 700 includes forwarding one or more data packets received from the base station via the first data tunnel to the second WLAN termination node via the third data tunnel based on the association between the first and third data tunnels in the data flow mapping table. As represented by block 780c, in various implementations, the method 700 includes forwarding one or more data packets received from the second WLAN termination node via the third data tunnel to the base station via the first data tunnel based on the association between the first and third data tunnels in the data flow mapping table.

Figure 8:
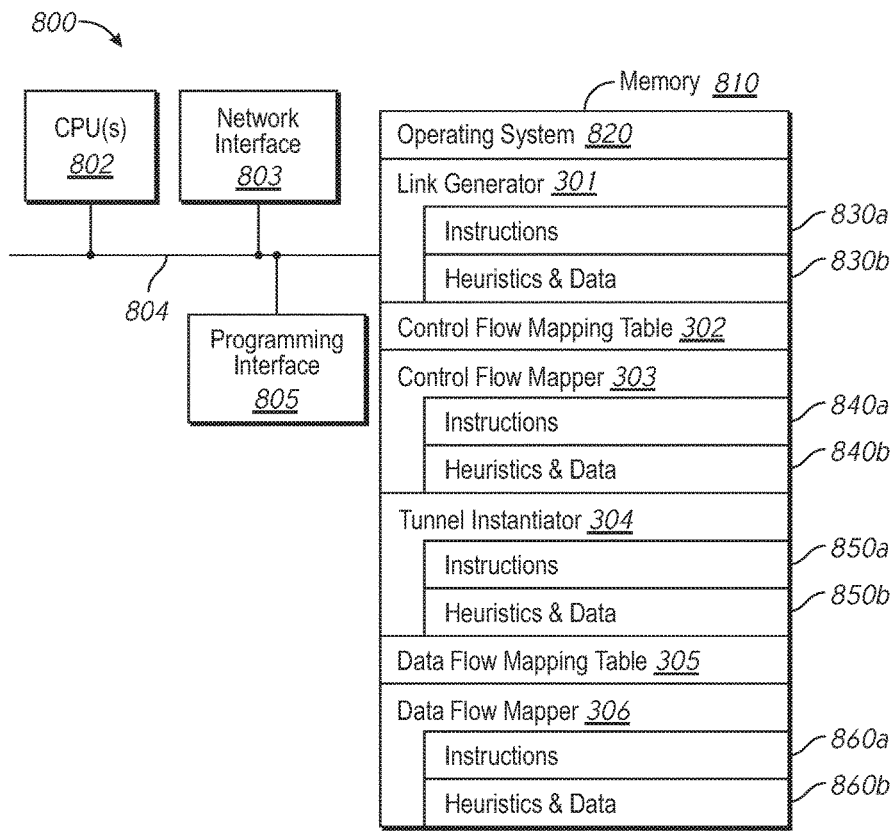
FIG. 8 illustrates a block diagram of an example of a networking device in accordance with various implementations.

FIG. 8 illustrates a block diagram of an example of a networking device 800 in accordance with various implementations. For example, in some implementations, the networking device 800 is similar to and adapted from the networking device 108 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the networking device 800 includes one or more processing units (CPUs) 802, a memory 810, a network interface 803, a programming (I/O) interface 805, and one or more communication buses 804 for interconnecting these and various other components. In some implementations, the one or more communication buses 804 include circuitry that interconnects and controls communications between system components.

The memory 810 includes high-speed random-access memory, such as DRAM, SRAM, DDR RAM, or other random access solid state memory devices. In some implementations, the memory 810 includes non-volatile memory, such as one or more magnetic disk storage devices, optical disk storage devices, flash memory devices, or other non-volatile solid-state storage devices. The memory 810 optionally includes one or more storage devices remotely located from the one or more CPUs 802. The memory 810 comprises a non-transitory computer readable storage medium. In some implementations, the memory 810 or the non-transitory computer readable storage medium of the memory 810 stores the following programs, modules and data structures, or a subset thereof including an optional operating system 820, a link generator 301, a control flow mapping table 302, a control flow mapper 303, a tunnel instantiator 304, a data flow mapping table 305, and a data flow mapper 306.

The link generator 301 is configured to generate control links between base stations and wireless termination nodes. To that end, in various implementations, the link generator 301 includes instructions and/or logic 830a, and heuristics and data 830b. The mapping information generated in conjunction with the control link generation is stored in the control flow mapping table 302.

The control flow mapper 303 is configured to map control packets between the base stations and the wireless termination nodes. To that end, in various implementations, the control flow mapper 303 includes instructions and/or logic 840a, and heuristics and data 840b. The control flow mapper 303 utilizes the control flow mapping table 302 in order to facilitate control packet mapping.

The tunnel instantiator 304 is configured to instantiate data tunnels between the networking device 800 and the base stations. The tunnel instantiator 304 is further configured to instantiate data tunnels between the networking device 800 and the wireless termination nodes. To that end, in various implementations, the tunnel instantiator 304 includes instructions and/or logic 850a, and heuristics and data 850b. The mapping information generated in conjunction with the tunnel instantiation is stored in the data flow mapping table 305.

The data flow mapper 306 is configured to map data packets between base stations and wireless termination nodes. To that end, in various implementations, the data flow mapper 306 includes instructions and/or logic 860a, and heuristics and data 860b. The data flow mapper 306 utilizes the data flow mapping table 305 in order to facilitate data packet mapping.

Moreover, FIG. 8 is intended more as functional description of the various features which can be present in a particular embodiment as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it is to be appreciated that the various features of implementations described above may be embodied in a wide variety of forms and that any specific structure and/or function described above is merely illustrative. It is to be appreciated that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements are not limited by these terms. These terms are only used to distinguish one element from another. For example, a first outgoing label could be termed a second outgoing label, and, similarly, a second outgoing label could be termed a first outgoing label, which changing the meaning of the description, so long as all occurrences of the "first outgoing label" are renamed consistently and all occurrences of the second outgoing label are renamed consistently. The first outgoing label and the second outgoing label are both outgoing labels, but they are not the same outgoing label.

What is claimed is:

1. A method comprising:
at a networking device with one or more processors and a non-transitory memory, the networking device communicatively coupled to a base station and one or more wireless local area network (WLAN) termination nodes:
obtaining a request to associate one or more electronic devices with the one or more WLAN termination nodes, wherein the one or more electronic devices are associated with the base station;
in response to obtaining the request to associate the one or more electronic devices with the one or more WLAN termination nodes:
generating, between the base station and the networking device, a control link based at least in part on a first identifier included in the request, wherein the first identifier is associated with the base station;
generating, between the networking device and a first WLAN termination node among the one or more WLAN termination nodes, a control link based at least in part on a second identifier associated with the base station, wherein the second identifier corresponds to a pseudonym for the base station; and
associating the first identifier with the second identifier in a control flow mapping table;
instantiating, between the base station and the networking device, a first data tunnel associated with a first tunneling protocol;

instantiating, between the networking device and the first WLAN termination node among the one or more WLAN termination nodes, a second data tunnel associated with a second tunneling protocol different from the first tunneling protocol; and associating the first data tunnel with the second data tunnel in a data flow mapping table.

2. The method of claim 1, further comprising forwarding one or more data packets received from the base station via the first data tunnel to the first WLAN termination node via the second data tunnel based on the association between the first and second data tunnels in the data flow mapping table.

3. The method of claim 1, further comprising forwarding one or more data packets received from the first WLAN termination node via the second data tunnel to the base station via the first data tunnel based on the association between the first and second data tunnels in the data flow mapping table.

4. The method of claim 1, wherein the data flow mapping table includes entries mappings between GPRS tunneling protocol user plane (GTP-U) tunnel endpoint identifiers (TEID) associated with the first data tunnel and generic routing encapsulation (GRE) keys associated with the second data tunnel.

5. The method of claim 1, wherein the base station corresponds to an eNodeB in a LTE-WLAN aggregation (LWA) deployment.

6. The method of claim 1, wherein the networking device is collocated with a security gateway (SecGW) node in a LTE-WLAN radio level integration with IPsec tunnel (LWIP) deployment.

7. The method of claim 1, wherein the networking device is collocated with an X2 gateway node.

8. The method of claim 1, further comprising:
in response to obtaining the request to associate the one or more electronic devices with the one or more WLAN termination nodes, generating, between the networking device and a second WLAN termination node among the one or more WLAN termination nodes, a control link based at least in part on the second identifier associated with the base station, wherein the second identifier corresponds to the pseudonym for the base station.

9. The method of claim 8, further comprising:
in response to a mobility event that transitions service of at least a subset of the one or more electronic devices from the first WLAN termination node to the second WLAN termination node:
instantiating, between the networking device and a second WLAN termination node among the one or more WLAN termination nodes, a third data tunnel associated with the second tunneling protocol; and
associating the first data tunnel with the third data tunnel in the data flow mapping table.

10. The method of claim 9, further comprising forwarding one or more data packets received from the base station via the first data tunnel to the second WLAN termination node via the third data tunnel based on the association between the first and third data tunnels in the data flow mapping table.

11. The method of claim 9, further comprising forwarding one or more data packets received from the second WLAN termination node via the third data tunnel to the base station via the first data tunnel based on the association between the first and third data tunnels in the data flow mapping table.

12. A non-transitory memory storing one or more programs, which, when executed by one or more processors of a networking device communicatively coupled to a base station and one or more wireless local area network (WLAN) termination nodes, cause the networking device to:
obtain a request to associate one or more electronic devices with the one or more WLAN termination nodes, wherein the one or more electronic devices are associated with the base station;
in response to obtaining the request to associate the one or more electronic devices with the one or more WLAN termination nodes:
generate, between the base station and the networking device, a control link based at least in part on a first identifier included in the request, wherein the first identifier is associated with the base station;
generate, between the networking device and a first WLAN termination node among the one or more WLAN termination nodes, a control link based at least in part on a second identifier associated with the base station, wherein the second identifier corresponds to a pseudonym for the base station; and
associate the first identifier with the second identifier in a control flow mapping table;
instantiate, between the base station and the networking device, a first data tunnel associated with a first tunneling protocol;
instantiate, between the networking device and the first WLAN termination node among the one or more WLAN termination nodes, a second data tunnel associated with a second tunneling protocol different from the first tunneling protocol; and
associate the first data tunnel with the second data tunnel in a data flow mapping table.

13. The non-transitory memory of claim 12, wherein the one or more programs further cause the networking device to:
forward one or more data packets received from the base station via the first data tunnel to the first WLAN termination node via the second data tunnel based on the association between the first and second data tunnels in the data flow mapping table.

14. The non-transitory memory of claim 12, wherein the data flow mapping table includes entries mappings between GPRS tunneling protocol user plane (GTP-U) tunnel endpoint identifiers (TEID) associated with the first data tunnel and generic routing encapsulation (GRE) keys associated with the second data tunnel.

15. The non-transitory memory of claim 12, wherein the one or more programs further cause the networking device to:
in response to obtaining the request to associate the one or more electronic devices with the one or more WLAN termination nodes, generate, between the networking device and a second WLAN termination node among the one or more WLAN termination nodes, a control link based at least in part on the second identifier associated with the base station, wherein the second identifier corresponds to the pseudonym for the base station.

16. The non-transitory memory of claim 15, wherein the one or more programs further cause the networking device to:
in response to a mobility event that transitions service of at least a subset of the one or more electronic devices from the first WLAN termination node to the second WLAN termination node:
instantiate, between the networking device and a second WLAN termination node among the one or more WLAN termination nodes, a third data tunnel associated with the second tunneling protocol; and
associate the first data tunnel with the third data tunnel in the data flow mapping table.

17. A networking device, comprising:
one or more processors;
a non-transitory memory; and
one or more programs stored in the non-transitory memory, which, when executed by the one or more processors, cause the networking device to:
  obtain a request to associate one or more electronic devices with one or more wireless local area network (WLAN) termination nodes, wherein the one or more electronic devices are associated with a base station;
  in response to obtaining the request to associate the one or more electronic devices with the one or more WLAN termination nodes:
    generate, between the base station and the networking device, a control link based at least in part on a first identifier included in the request, wherein the first identifier is associated with the base station;
    generate, between the networking device and a first WLAN termination node among the one or more WLAN termination nodes, a control link based at least in part on a second identifier associated with the base station, wherein the second identifier corresponds to a pseudonym for the base station; and
    associate the first identifier with the second identifier in a control flow mapping table;
  instantiate, between the base station and the networking device, a first data tunnel associated with a first tunneling protocol;
  instantiate, between the networking device and the first WLAN termination node among the one or more WLAN termination nodes, a second data tunnel associated with a second tunneling protocol different from the first tunneling protocol; and
  associate the first data tunnel with the second data tunnel in a data flow mapping table.

18. The networking device of claim 17, wherein the data flow mapping table includes entries mappings between GPRS tunneling protocol user plane (GTP-U) tunnel endpoint identifiers (TEID) associated with the first data tunnel and generic routing encapsulation (GRE) keys associated with the second data tunnel.

19. The networking device of claim 17, wherein the one or more programs further cause the networking device to:
  in response to obtaining the request to associate the one or more electronic devices with the one or more WLAN termination nodes, generate, between the networking device and a second WLAN termination node among the one or more WLAN termination nodes, a control link based at least in part on the second identifier associated with the base station, wherein the second identifier corresponds to the pseudonym for the base station.

20. The networking device of claim 19, wherein the one or more programs further cause the networking device to:
  in response to a mobility event that transitions service of at least a subset of the one or more electronic devices from the first WLAN termination node to the second WLAN termination node:
    instantiate, between the networking device and a second WLAN termination node among the one or more WLAN termination nodes, a third data tunnel associated with the second tunneling protocol; and
    associate the first data tunnel with the third data tunnel in the data flow mapping table.

* * * * *